United States Patent
Bush (10) Patent No.: US 11,228,430 B2
(45) Date of Patent: Jan. 18, 2022

(54) COMMUNICATION SYSTEMS AND METHODS

(71) Applicant: General Electric Company, Schenectady, NY (US)

(72) Inventor: Stephen Francis Bush, Latham, NY (US)

(73) Assignee: General Electric Technology Gmbh, baden (CH)

(*) Notice: Subject to any disclaimer, the term of this patent is extended or adjusted under 35 U.S.C. 154(b) by 97 days.

(21) Appl. No.: 16/569,355

(22) Filed: Sep. 12, 2019

(65) Prior Publication Data

US 2021/0083863 A1     Mar. 18, 2021

(51) Int. Cl.
| | | |
|---|---|---|
| *H04L 29/06* | (2006.01) | |
| *H04L 9/08* | (2006.01) | |
| *G06N 10/00* | (2019.01) | |
| *H04L 9/12* | (2006.01) | |

(52) U.S. Cl.
CPC ........... *H04L 9/0852* (2013.01); *G06N 10/00* (2019.01); *H04L 9/12* (2013.01); *H04L 63/04* (2013.01)

(58) Field of Classification Search
CPC ....... H04L 9/0852; H04L 9/0855; H04L 9/08; H04L 9/12; H04L 63/04; H04L 63/061; G06N 10/00
See application file for complete search history.

(56) References Cited

U.S. PATENT DOCUMENTS

| | | | |
|---|---|---|---|
| 5,764,765 A * | 6/1998 | Phoenix ................ | H04L 9/0858 380/256 |
| 7,346,166 B2 | 3/2008 | Inoue et al. | |
| 8,189,966 B2 | 5/2012 | Peev et al. | |
| 8,483,391 B2 | 7/2013 | Townsend | |
| 8,483,394 B2 * | 7/2013 | Nordholt ........... | H04W 12/0431 380/279 |
| 8,680,640 B2 | 3/2014 | Mori et al. | |
| 8,929,554 B2 | 1/2015 | Hughes et al. | |
| 9,356,721 B2 * | 5/2016 | Haulin ................. | H04J 3/0661 |

(Continued)

FOREIGN PATENT DOCUMENTS

| | | |
|---|---|---|
| WO | 9507582 A1 | 3/1995 |
| WO | 2012044855 A2 | 4/2012 |
| WO | 2017148141 A1 | 8/2017 |

OTHER PUBLICATIONS

European Search Report issued in European Patent Application No. 20195836.0, dated Feb. 10, 2021, 6 pages.

*Primary Examiner* — Hosuk Song
(74) *Attorney, Agent, or Firm* — Eversheds Sutherland (US) LLP (57) ABSTRACT

A communication system is provided that include one or more processors that are configured to instruct computing devices that communicate messages with each other via a time-sensitive network to securely exchange the messages using secret information, ad direct the computing devices to exchange the secret information via a dedicated quantum channel in the time-sensitive network. The one or more processors are also configured to determine a quantum channel synchronization time associated with the secret information exchanged via the dedicated quantum channel, and modify a local classical oscillator based on the quantum channel synchronization time, the local classical oscillator configured to provide a current time.

20 Claims, 2 Drawing Sheets

(56) References Cited

U.S. PATENT DOCUMENTS

| | | | |
|---|---|---|---|
| 9,866,379 B2 * | 1/2018 | Nordholt | H04B 10/70 |
| 10,218,628 B2 * | 2/2019 | Bush | H04L 47/27 |
| 10,349,367 B2 * | 7/2019 | Aldana | H04W 24/10 |
| 10,819,462 B2 * | 10/2020 | Bush | H04L 9/0852 |
| 2016/0373441 A1 | 12/2016 | Sirivara | |
| 2019/0123847 A1 | 4/2019 | Bush et al. | |

* cited by examiner

COMMUNICATION SYSTEMS AND METHODS

GOVERNMENT LICENSE RIGHTS

This invention was made with government support under contract number DE-OE0000894 awarded by the Department of Energy. The government has certain rights in the invention.

FIELD

The subject matter described herein relates to sharing non-publicly available information (e.g., secret information) within computerized communication networks, such as time-sensitive networks and protection for the time-sensitive networks.

BACKGROUND

The IEEE 802.1 Time-Sensitive Networking Task Group has created a series of standards that describe how to implement deterministic, scheduled Ethernet frame delivery within an Ethernet network. Time-sensitive networking benefits from advances in time precision and stability to create efficient, deterministic traffic flows in an Ethernet network.

Time-sensitive networks can be used in safety critical environments. In these environments, timely and fast control of devices is needed to ensure proper operation of all devices, and that information is not improperly shared. Encryption may be needed in these networks to ensure that malevolent actors do not hack into or otherwise interfere with communication through the time-sensitive networks and cause damage or harm.

BRIEF DESCRIPTION

In one or more embodiments a communication system is provided with one or more processors configured to instruct computing devices that communicate messages with each other via a time-sensitive network to securely exchange the messages using secret information. The one or more processors are also configured to direct the computing devices to exchange the secret information via a dedicated quantum channel in the time-sensitive network, determine a quantum channel synchronization time associated with the secret information exchanged via the dedicated quantum channel, and modify a local classical oscillator based on the quantum channel synchronization time. The local classical oscillator is configured to provide a current time.

In one or more embodiments, a method includes instructing computing devices that communicate messages with each other via a time-sensitive network to securely exchange the messages using secret information, directing the computing devices to exchange the secret information via a dedicated quantum channel in the time-sensitive network, and determining a quantum channel synchronization time associated with the secret information exchanged via the dedicated quantum channel. A local classical oscillator is configured to provide a current time and is modified based on the quantum channel synchronization time.

In one or more embodiments, a method includes instructing computing devices that communicate messages with each other via a time-sensitive network to securely exchange the messages using secret information, directing the computing devices to exchange the secret information via a dedicated quantum channel in the time-sensitive network, and determining a classical channel synchronization time associated with the time-sensitive network. The method also includes modifying the local classical oscillator based on the classical channel synchronization time, determining a quantum channel synchronization time associated with the secret information exchanged via the dedicated quantum channel, and comparing the classical channel synchronization time and the quantum channel synchronization time. The local classical oscillator is configured to provide a current time and is modified based on the quantum channel synchronization time after the local classical oscillator is modified, based on the classical channel synchronization time responsive to a difference between the classical channel synchronization time and quantum channel synchronization time exceeding a threshold time period.

BRIEF DESCRIPTION OF THE DRAWINGS

A full and enabling disclosure of the present disclosure is set forth in the specification, which refers to the appended Figures, in which.

DETAILED DESCRIPTION

Reference now will be made in detail to embodiments of the present disclosure, one or more examples of which are illustrated in the drawings. Each example is provided by way of explanation of the present disclosure, and is not a limitation of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Quantum key distribution can be used to protect time-sensitive networking while time-sensitive networking provides support for implementing quantum key distribution. Precise synchronization and timing may be needed on the quantum channel and efficient utilization of the classical channel may be desired to generate quantum keys at higher and more deterministic rates for use in time-sensitive networking.

Quantum key distribution may use components of quantum mechanics by allowing computing devices (e.g., computers, sensors, controllers, etc.) to produce a shared random secret key known only to the computing devices. This shared key is used to encrypt and decrypt messages communicated between the computing devices. Information can be encoded in quantum states (e.g., qubits) instead of bits, which allows the computing devices to detect when a third party computing device is attempting to detect or listen in to the communications using the quantum key. This third party attempt can introduce errors during reception of the shared quantum key, which is detected by one or more of the computing devices.

In one embodiment, a control system and method for a time-sensitive network determine the time to transmit secret information through the time-sensitive network using both a classical channel and a quantum channel. The classical channels described herein can include tangible conductive elements used to communicate signals by conducting electric signals, such wires, cables, buses, etc. A grandmaster device can determine the time for the secret information to be transmitted through classical channels, including by using timing protocols as set out in IEEE 802.1AS.TM.-2011. Once the secret message is received through the classical channels at a local computing device, a local oscillator (e.g., a clock) of the local computing device uses the synchronization time sent by the grandmaster device and associated with the secret message to ensure synchronization of the timing mechanism of the local computing device is consistent with other local computing devices that communicate with the grandmaster device. The synchronization time is a time of the grandmaster device, such as 3:00 and 0 seconds such that all oscillators (clocks) in a network are based on the grandmaster synchronization time and are to be synched with the grandmaster synchronization time. Then, the secret message, including the grandmaster synchronization time, is temporarily stored. As used herein, when this synchronization time is transmitted to an end device without using a quantum channel, the synchronization time is referred to as a classical channel synchronization time. When a quantum channel is used to transmit the synchronization time, the synchronization time is referred to as a quantum channel synchronization time.

The classical channel synchronization time is compared to the quantum channel synchronization time that the control system has determined based on the signal transmitted though the quantum channel. If these synchronization times are different, or alternatively the difference in synchronization times exceed a threshold time period, the controller may modify the local oscillator to correct the discrepancy. For example, the controller can receive a malicious message that results in a local oscillator running at two minutes faster than should be based on the grandmaster time. The extra two minutes in one example may cause mistiming of a machine or safety equipment causing safety concerns for the machine operator. However, by storing the classical channel synchronization time in a local memory, the more secure quantum channel synchronization time may be compared to the classical channel synchronization time. From this comparison, the local oscillator may be changed to the correct quantum channel synchronization time. Consequently, the local oscillator is nearly immediately corrected, reducing effects of the malicious message. At the same time as the correction a message may be sent alerting individuals of the discrepancy. In this manner, the quantum channel synchronization time may be used to verify, or authenticate, the classical channel synchronization time. While a single malicious message received through the classical channel may cause an initial impact, the system immediately corrects the time synchronization and is able to notify users of the discrepancies in the time synchronization. Thus, negative impact of the malicious message is reduced while notification of the attack is achieved.

Secret information or data includes information or data that is transferred from one computing device to at least one other computing device and is not readable by the other computing devices unless granted access to the data or information. The data or information may be encrypted, password protected, or the like, such that decryption information (e.g., a key, code, password, etc.) is needed to access to the data or information. The secret data and information includes information and data that is not received until granted access, or is not readable until granted access. The secret information and data can include the key, code, password, or the like, that is used to access to the data and information. Optionally, the decryption information can be sent separately. As an example, quantum key distribution devices as described herein randomly generate quantum keys that expire after a predetermined period. These quantum keys are sent over a quantum channel to a computing device and if inputted, the computing device may receive readable data and information from another computing device, or be able to read previously unreadable data and information received from another computing device. In this example, both the quantum keys and the data and information that is readable only after use of a quantum key is considered secret. Secret does not refer to a subjective determination made by an individual, and only to whether information is readable to a computing device before being granted access to the data or information. In this manner, if the data or information provided that is not readable until access is granted is that New Year's Day is January $1^{st}$, this information and data is still considered secret because access to the information had to be granted. Similarly, if information and data that is considered top secret by the United States government is provided over a communication path, but is readable without a computing device having to grant access to the information and data, such information and data is not considered secret in the context of this disclosure.

The classical devices described herein can include a device, channel, component, wiring, cable, communication pathway, etc. that provide or enable communication through networks not providing quantum information. Examples of classical systems are wire-based systems, systems using wire-based protocols, wireless-based systems, systems using wireless-based protocols, or the like, that communicate over a network, server, or the like between devices. Such wire and wireless-based systems include, but are not limited to Ethernet, phone line systems, broadband systems, systems using unshielded twisted pair cable, systems using coaxial cables, cellular systems, fiber optic systems, internet-based systems, or the like.

Quantum key distribution devices described herein can include any and all systems and methods that utilize quantum mechanics, including the use of quantum states to transmit key-based information through a quantum channel that may be used to allow two remote devices to securely communicate and share data and information. Example quantum states include photon polarization states, orthogonal states, other conjugate states, entangled based states, or the like.

A quantum channel described herein may include any pathway through which quantum states pass to communicate information or data, including pathways through which quantum states are transmitted from a first device to a second device using properties of quantum mechanics. Example quantum channels include pathways through optical fiber, a bundle of optical fiber, or the like.

Figure 1:
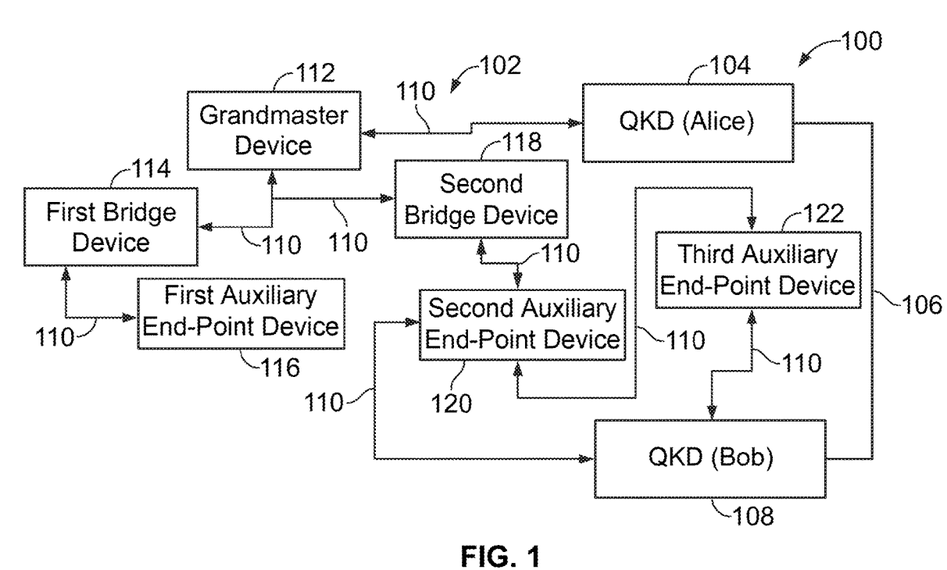
FIG. 1 is a schematic block diagram of an example communication system in accordance with embodiments herein.

FIG. 1 schematically illustrates one embodiment of a communication system 100 for a time-sensitive network system 102. The components shown in FIG. 1 represent hardware circuitry that includes and/or is connected with one or more processors (e.g., one or more microprocessors, field programmable gate arrays, and/or integrated circuits) that operate to perform the functions described herein. The components of the network system 102 can be communicatively coupled with each other by one or more wired and/or wireless connections. Not all connections between the components of the network system 102 are shown herein. The network system 102 can be a time-sensitive network in that the network system 102 is configured to operate according to one or more of the time-sensitive network standards of IEEE, such as the IEEE 802.1AS.TM.-2011 Standard, the IEEE 802.1Q.TM.-2014 Standard, the IEEE 802.1Qbu.TM.-2016 Standard, and/or the IEEE 802.3br.TM.-2016 Standard. This includes configurations to implement precision time protocols (PTPs) in order to synchronize clocks of numerous endpoint devices within the network system 102.

The network system 102 includes a first quantum key device 104, referred to as "Alice" of a quantum key distribution (QKD) system, that transmits messages via a quantum channel 106 to a second quantum key device 108, referred to as "Bob". While in this example the first quantum key device 104 transmits the messages and the second quantum key device 108 receives the messages, in other example embodiments, the second quantum key device 108 transmits the message and is considered "Alice" while the first quantum key device 104 receives the message and is considered "Bob".

The quantum channel 106 may be formed from an optical fiber, or bundle of optical fibers, or the like that transmits a quantum signal carrying a quantum state, or encoded qubits, along their path. The optical fiber may be disposed within a cable for additional protection and may receive an input from a laser or other photon generating source. Any attempt to access or monitor the quantum channel results in modification of the channel, disrupting the quantum signal being transmitted and causing an error. This error may be detected to warn a user of a potential hacker or eavesdropper (referred to as "Eve") attempting to improperly access the quantum channel 106.

Both the first quantum key device 104 and second quantum key device 108 are coupled to classical channels 110 to communicate with a grandmaster device 112. The classical channels 110 may include or be implemented in cables, wires, Ethernet cables and connectors, or the like. In examples, the classical channels 110 may require a public channel, by means of transmission control protocol (TCP) connections in the network. For the classical channel, implementation of quantum key distribution may rely upon TCP. However, operating directly over Ethernet with time-sensitive networks may be more efficient. TCP guarantees that the information exchanged on the public channel is delivered. However, it is vulnerable to congestion and to Denial of Service (DoS) attacks that disrupt key generation. TCP congestion can have a significant impact on the quantum key generation rate.

In another example, the grandmaster device 112 may implement a PTP protocol in order to provide numerous endpoint devices messages to ensure synchronization of clocks of all or at least some of the endpoint devices. Endpoint devices are any local device, including the first quantum key device 104, the second quantum key device 108, or any local computing devices within the network system 102 that are configured to communicate (e.g., broadcast, transmit, and/or receive) messages through a series of classical channels. In the example of FIG. 1, the first quantum key device 104 is illustrated as an endpoint device that has a direct connection with the grandmaster device 112 through a classical channel 110. By having a direct connection, or direct coupling, a protocol may be used in the classical channel 110 between the grandmaster device 112 and the quantum key device 104 that exceeds that provided by and of the IEEE 802.1AS.TM.-2011 Standard, the IEEE 802.1Q.TM.-2014 Standard, the IEEE 802.1Qbu.TM.-2016 Standard, and/or the IEEE 802.3br.TM.-2016 Standard. This includes a PTP protocol that is specific to the classical channel between the grandmaster device 112 and classical channel. In this manner, the grandmaster synchronization time is passed through a classical channel that is includes security that is better than classical channels in the network between remote computing devices and the grandmaster device 112. Then the grandmaster synchronization time is passed through the quantum channel, again resulting in enhanced security of the grandmaster synchronization time.

Intermediary devices may be provided that are within and part of the classical channel including a first bridge device 114 that is directly coupled to the grandmaster device 112. A bridge device works at a data link layer to provide interconnection with other bridge networks that use the same protocol to connect the networks to provide a communication path between them. In this example, the first bridge device 114 is coupled to a first auxiliary end-point device 116 and a second bridge device 118. The second bridge device 114 in this example is coupled to a second auxiliary end-point device 120 that is coupled to a third auxiliary end-point device 122 and the second quantum key device 108. The third auxiliary end-point device 122 is also coupled to the second quantum key device 108.

In this manner, the example network system 102 illustrates how a quantum key device 104 or 108, similar to any other end-point device, may be directly coupled to the grandmaster device 112, coupled to the grandmaster device via a bridge device 114 or 118, coupled to the grandmaster device 112 via an end-point device, coupled to the grandmaster device 112 via two end-point devices, coupled to the grandmaster device 112 via a bridge and an end-point device, or the like. In each instance a signal travels through an existing classical channel, including channels that may include public channels. To provide accurate timing for each of the end devices within the network system 102, the amount of time for a message to reach the desired endpoint device must be determined to ensure the clock of the desired endpoint device is synchronized with the other clocks in the TSN.

Figure 2:
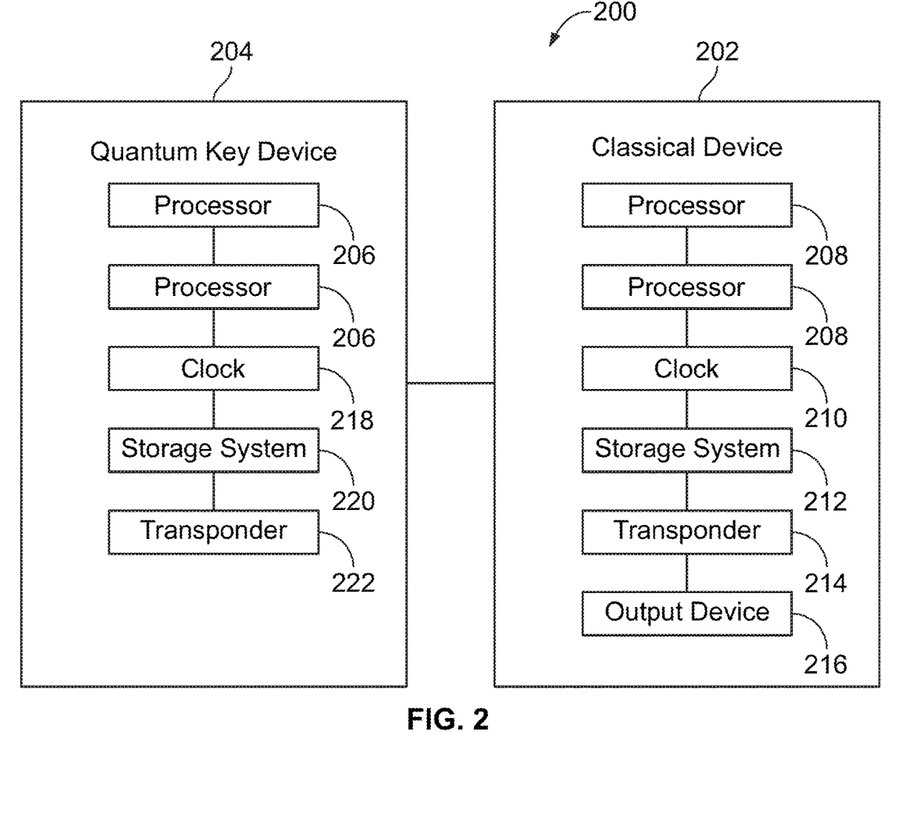
FIG. 2 is a schematic block diagram of an example quantum key device in accordance with embodiments herein.

FIG. 2 illustrates an example quantum key system 200. In one example, the quantum key system 200 includes one of, or both of, the quantum key devices 104 and 108 of FIG. 1. The quantum key system 200 may include a classical device 202 and quantum key device 204. The quantum key device 204 may be one of or both of, the quantum key devices 104 and 108 of FIG. 1. The classical device 202 may be any computing device that provides a classical communication pathway, including the end-point devices of FIG. 1.

In an example, the classical device 202 and quantum key device 204 may be separate devices including two separate housings with a cable or wire providing an electrical connection between the separate housings. In another example, the classical device 202 and quantum key device 204 share a common housing. In yet another example, as illustrated in FIG. 1, the quantum key device 204 is within the classical device 202. In one such example, the quantum key device 204 may be a chip that may be electrically connected to one or more processors 206 of the classical device 202. Specifically, when the quantum key device 204 is a chip, the chip may be located within the classical device 202 without the need for a connection cable between the quantum key device 204 and classical device 202.

The classical device 202 may include one or more processors 208, a clock 210, a storage system 212, a transponder 214, and an output device 216 that may include a display or a display screen. The storage system 212 is configured to store data, information, signals, messages, determinations, or the like, including signals and messages that include the classical channel synchronization time, or the grandmaster synchronization time. The transponder 214 may receive data and information from the quantum key device 204 that may include signals related to the quantum channel synchronization time and/or differences in the classical channel synchronization time and the quantum channel synchronization time. The output device may be used to display messages, including error messages that indicate a difference, or a difference that exceeds a threshold time period between the classical channel synchronization time and quantum channel synchronization time is present.

In addition to the one or more processors 206, the quantum key device 204 includes a clock 218, a storage system 220, and a transponder 222. The clock 218 is electrically connected to the processors to receive PTP, TCP, or other communication protocol to synchronize its time with other clocks with a network of network devices. The storage system 220 may be a long term memory, short term memory, temporary memory, removable memory, or the like that is able to store data, information, signals, and the like related to a signal received from other quantum key devices, end-point devices, grandmaster devices, or the like. The storage system 220 may be a first in first out (FIFO) memory, include a look-up table, include system algorithms, or the like to be used when making determinations related to synchronizing clocks 218 with a network system such as the network system 102 of FIG. 1.

Figure 3:
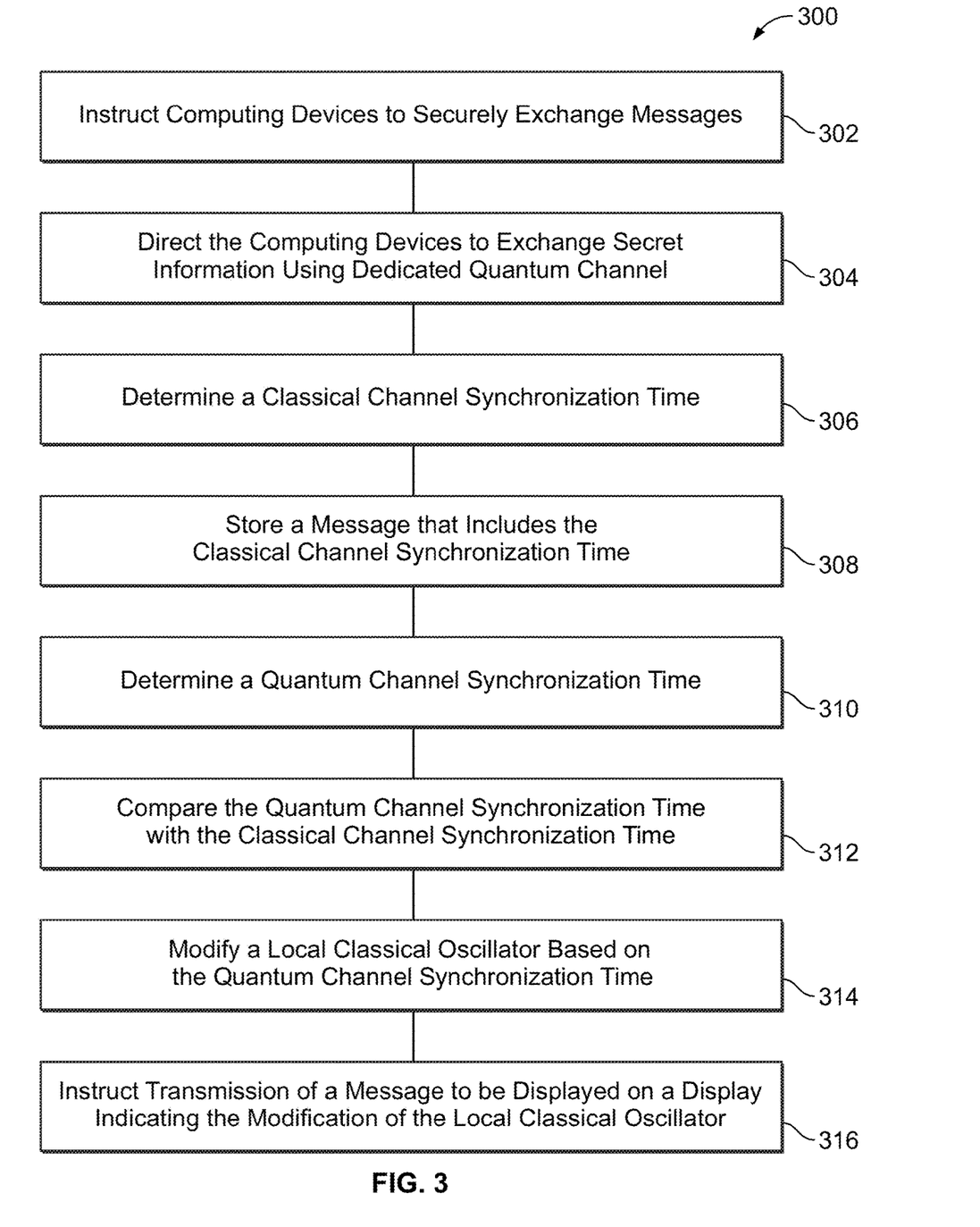
FIG. 3 is a flowchart describing an example process for synchronizing clocks in a network in accordance with embodiments herein.

FIG. 3 illustrates a flowchart of one embodiment of a method 300 of synchronizing clocks within a TSN. The method 300 can represent operations performed by the TSN 102 of FIG. 1.

At 302, one or more processors instruct computing devices that communicate messages with each other via a time-sensitive network to securely exchange the messages using secret information. In one example, the computing devices communicate messages over a wire-based network. In other examples, a wireless network may be provided. Alternatively, a combination of wire-based devices and wireless-based devices may be in the network. The secret information may be protected by encrypting the message, providing an encryption key, or the like to protect the communication. In one example, the secret information includes one or more of a quantum encryption key, an indication of non-repudiation or a data hash.

At 304, one or more processors direct the computing devices to exchange the secret information using a dedicated quantum channel in the time-sensitive network. In particular the quantum channel is used to measure quantum bit error rates in links that form the quantum channel between the computing devices that are dedicated to exchanging the secret information. The secret information may be passed along the quantum channel, or alternatively, a temporary key may be generated and passed along the quantum channel that may be used to gain access to a classical channel where the secret information is passed.

At 306, one or more processors determine a classical channel synchronization time associated with the time-sensitive network. In one example, the one or more processors receive a communication message from a grandmaster device that includes a grandmaster synchronization time. The one or more processors then calculate the amount of time required for the communication message to go from the grandmaster device to the one or more processors. In one example, an algorithm is used in association with the pathway of the signal that carries the communication message from the grandmaster device to the one or more processors. In another example, a look-up table is used with the distance traveled determined and the look-up table associated with the route taken and the projected amount of time required to travel the distance provided on the route. In yet another example, the one or more processors determine the time based on timing protocols as set out in IEEE 802.1AS.TM.-2011. Then, by adding the time the communication required to reach the end device through the classical channels to the grandmaster synchronization time, the classical channel synchronization time is determined.

At 308, one or more processors store a message of the messages that includes the classical channel synchronization time. Specifically, the one or more processors allow modification of a local oscillator of a computing device based on the classical channel synchronization time before storing the message that includes the classical channel synchronization time. The local oscillator, in one example, is a clock and configured to provide a current time. This methodology allows for malicious messages that may be used to distort, or cause inaccurate modification of the local oscillator. Still, verifying the classical channel synchronization time prior to modification would cause additional activity on the signal that would need to be accounted for in such a method. This time would vary based on the nature of the communication, potentially causing error associated with the classical channel synchronization time. Because the messages are stored, the analysis may take place after the oscillator is modified, preventing error as a result of the verification before the oscillator is modified. Meanwhile, by verifying the message immediately after implemented, if a message was malicious, the malicious content is immediately identified, and corrective measures may be taken accordingly as described further herein. Because malicious messages may only cause so much harm to the messages, and may be instantly corrected, the effect of the malicious message is reduced. To this end, because no verification of messages currently exists, this verification process improves timing of the system compared to systems that don't use the system, even though malicious messages are still received herein.

At 310, one or more processors determine a quantum channel synchronization time associated with the secret information exchanged via the dedicated quantum channel. In one example, the quantum channel synchronization time is determined from a message stored in the memory after the local classical oscillator is modified based on the classical channel synchronization time. Specifically, similar to the classical channel synchronization time, algorithms, look-up tables, calculations, or the like may be used to determine and add the amount of time for the signal with the grandmaster synchronization time to be transmitted through the quantum channel and to reach the one or more processors at an end device. Because the quantum channel does not transmit messages along the channel when a third party eavesdropper accesses the channel, a malicious or compromised message may not be received through the quantum channel. Therefore, the quantum channel synchronization time cannot be disrupted by a malicious message while in the quantum channel and is more accurate than the classical channel synchronization time that may more easily be corrupted by a malicious message.

At 312, one or more processors compare the quantum channel synchronization time with the classical channel synchronization time. In one example, comparing the quantum channel synchronization time with the classical channel synchronization time includes at least one of using a look-up table, using an algorithm, or using a calculation including subtracting the quantum channel synchronization time from the classical channel synchronization time. Because the quantum channel cannot provide a time-based message that has been compromised, differences in time between the quantum channel synchronization time and the classical channel synchronization time may be used to identify malicious messages related to the time-sensitive network At 314, one or more processors modify a local classical oscillator based on the quantum channel synchronization time. The local classical oscillator presents the current time for users. In one example, modifying the local classical oscillator based on the classical channel synchronization time occurs before modifying the local classical oscillator based on the quantum channel synchronization time. In particular, as described above, by allowing the classical channel synchronization time to be used to modify the oscillator, additional measuring errors that could be caused as a result of a verification step before modifying the oscillator based on the classical channel synchronization time is avoided.

If the synchronization times vary, the one or more processors may vary the oscillator to be based on the uncompromised quantum channel synchronization time to combat instances when a malicious message is causing the variation. In other examples, a threshold time period difference between the classical channel synchronization time and quantum channel synchronization time must be determined prior to modification or adjustment of the local classical oscillator based on the quantum channel synchronization time. In particular, rounding errors, measurement errors, or the like may cause very slight differences in timing between the classical channel synchronization time and the quantum channel synchronization time. These slight differences may occur even though a malicious message has not been provided. Each time a modification is made, wear occurs, chances for inaccuracies occur, or the like. Consequently, by providing a threshold time period difference between the classical channel synchronization time and quantum channel synchronization time, the local classical oscillator is only modified as needed to correct timing errors from malicious messages, preventing such unneeded wear and functionality.

At 316, the one or more processors instruct transmission of a message to be displayed on a display of at least one computing device of the computing devices indicating the modification of the local classical oscillator based on the quantum channel synchronization time after modifying the local classical oscillator based on the classical channel synchronization time. In one example, instructing transmission of the message to be displayed on the display at the at least one computing device of the computing devices is based on a difference between the quantum channel synchronization time and the classical channel synchronization time exceeding a threshold time period. In this manner, a computing device may display on a screen or alert a user of a potential malicious message, or attempt to manipulate the time sensitive network. By notifying a user immediately of a potential malicious message, the user may take immediate measures to attempt to catch or determine the individual that is sending the malicious message, or is attempting manipulate the time sensitive network. In this manner, additional protection is afforded to the time sensitive network by using quantum channel communication.

In one or more embodiments a communication system is provided that includes one or more processors that are configured to instruct computing devices that communicate messages with each other via a time-sensitive network to securely exchange the messages using secret information, and direct the computing devices to exchange the secret information via a dedicated quantum channel in the time-sensitive network. The one or more processors are also configured to determine a quantum channel synchronization time associated with the secret information exchanged via the dedicated quantum channel, and modify a local classical oscillator based on the quantum channel synchronization time, the local classical oscillator configured to provide a current time.

Optionally, the one or more processors are also configured to determine a classical channel synchronization time associated with the time-sensitive network, and compare the quantum channel synchronization time with the classical channel synchronization time. In another aspect, the one or more processors are also configured to modify the local classical oscillator based on the quantum channel synchronization time and the classical channel synchronization time comparison. In yet another aspect, the one or more processors are configured to modify the local classical oscillator based on the classical channel synchronization time before modifying the local classical oscillator based on the quantum channel synchronization time, store a first message of the messages that includes the classical channel synchronization time, and determine the classical channel synchronization time from the first message stored after the local classical oscillator is modified based on the classical channel synchronization time. Optionally, the one or more processors are configured to instruct transmission of a first message to be displayed on a display of at least one computing device of the computing devices indicating the modification of the local classical oscillator based on the quantum channel synchronization time. In another aspect, the one or more processors are configured to instruct transmission of the first message to be displayed on the display at the at least one computing device of the computing devices based on a difference between the quantum channel synchronization time and the classical channel synchronization time exceeding a threshold time period.

In one example, the secret information includes one or more of a quantum encryption key, an indication of non-repudiation, or a data hash. In another example, the one or more processors are configured to measure quantum bit error rates in links that form the quantum channel between the computing devices that are dedicated to exchanging the secret information.

In one or more embodiments, a method is provided that includes instructing computing devices that communicate messages with each other via a time-sensitive network to securely exchange the messages using secret information, and directing the computing devices to exchange the secret information via a dedicated quantum channel in the time-sensitive network. The method also includes determining a quantum channel synchronization time associated with the secret information exchanged via the dedicated quantum channel, and modifying a local classical oscillator configured to provide a current time based on the quantum channel synchronization time.

Optionally the method also includes determining a classical channel synchronization time associated with the time-sensitive network, and comparing the quantum channel synchronization time with the classical channel synchronization time.

In another aspect, comparing the quantum channel synchronization time with the classical channel synchronization time includes at least one of using a look-up table, using an algorithm, or subtracting the quantum channel synchronization time from the classical channel synchronization time. In another example, the method also includes modifying the local classical oscillator based on the quantum channel synchronization time and the classical channel synchronization time comparison. Optionally, the method also includes determining the quantum channel synchronization time after the local classical oscillator is modified based on the classical channel synchronization time, and modifying the local classical oscillator based on the classical channel synchronization time before modifying the local classical oscillator based on the quantum channel synchronization time.

In one aspect the method includes instructing transmission of a first message to be displayed on a display of at least one computing device of the computing devices indicating the modification of the local classical oscillator based on the quantum channel synchronization time after modifying the local classical oscillator based on the classical channel synchronization time. Optionally, the method also includes instructing transmission of the first message to be displayed on the display at the at least one computing device of the computing devices based on a difference between the quantum channel synchronization time and the classical channel synchronization time exceeding a threshold time period.

Optionally, the secret information includes one or more of a quantum encryption key, an indication of non-repudiation, or a data hash. In another aspect the method also includes measuring quantum bit error rates in links that form the quantum channel between the computing devices that are dedicated to exchanging the secret information.

In one or more embodiments a method is provided that includes instructing computing devices that communicate messages with each other via a time-sensitive network to securely exchange the messages using secret information, and directing the computing devices to exchange the secret information via a dedicated quantum channel in the time-sensitive network. The method also includes determining a classical channel synchronization time associated with the time-sensitive network, and modifying the local classical oscillator based on the classical channel synchronization time. The method further includes determining a quantum channel synchronization time associated with the secret information exchanged via the dedicated quantum channel, comparing the classical channel synchronization time and the quantum channel synchronization time, and modifying the local classical oscillator configured to provide a current time based on the quantum channel synchronization time after modifying the local classical oscillator based on the classical channel synchronization time when a difference between the classical channel synchronization time and quantum channel synchronization time exceeds a threshold time period.

Optionally, the method also includes instructing transmission of a message to be displayed on a display of at least one computing device of the computing devices indicating the modification of the local classical oscillator based on the quantum channel synchronization time after modifying the local classical oscillator based on the quantum channel synchronization time. In another aspect, the secret information includes one or more of a quantum encryption key, an indication of non-repudiation, or a data hash.

While the present disclosure has been described in terms of one or more particular embodiments, it is apparent that other forms could be adopted by one skilled in the art. It is to be understood that the use of "comprising" in conjunction with the alloy compositions described herein specifically discloses and includes the embodiments wherein the alloy compositions "consist essentially of" the named components (i.e., contain the named components and no other components that significantly adversely affect the basic and novel features disclosed), and embodiments wherein the alloy compositions "consist of" the named components (i.e., contain only the named components except for contaminants which are naturally and inevitably present in each of the named components).

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A communication system comprising:
one or more processors configured to:
instruct computing devices that communicate messages with each other via a time-sensitive network to securely exchange the messages using secret information, wherein the secret information includes an indication of non-repudiation;
direct the computing devices to exchange the secret information via a dedicated quantum channel in the time-sensitive network;
determine a quantum channel synchronization time associated with the secret information exchanged via the dedicated quantum channel; and
modify a local classical oscillator based on the quantum channel synchronization time, the local classical oscillator configured to provide a current time.

2. The communication system of claim 1, wherein the one or more processors are configured to:
determine a classical channel synchronization time associated with the time- sensitive network; and
compare the quantum channel synchronization time with the classical channel synchronization time.

3. The communication system of claim 2, wherein the one or more processors are also configured to:
modify the local classical oscillator based on the quantum channel synchronization time and comparison of the quantum channel synchronization time with the classical channel synchronization time.

4. The communication system of claim 3, wherein the one or more processors are configured to:
modify the local classical oscillator based on the classical channel synchronization time before modifying the local classical oscillator based on the quantum channel synchronization time;
store a first message of the messages that includes the classical element synchronization time;
determine the classical channel synchronization time from the first message stored after the local classical oscillator is modified based on the classical channel synchronization time.

5. The communication system of claim 3, wherein the one or more processors are configured to: instruct transmission of a first message to be displayed on a display of at least one computing device of the computing devices indicating the modification of the local classical oscillator based on the quantum channel synchronization time.

6. The communication system of claim 5, wherein the one or more processors are configured to: instruct transmission of the first message to be displayed on the display at the at least one computing device of the computing devices based on a difference between the quantum channel synchronization time and the classical channel synchronization time exceeding a threshold time period.

7. The communication system of claim 1, wherein the secret information further includes one or more of a quantum encryption key or a data hash.

8. The communication system of claim 1, wherein the one or more processors are configured to: measure quantum bit error rates in links that form the quantum channel between the computing devices that are dedicated to exchanging the secret information.

9. A method comprising:
instructing computing devices that communicate messages with each other via a time-sensitive network to securely exchange the messages using secret information, wherein the secret information includes an indication of non-repudiation;
directing the computing devices to exchange the secret information via a dedicated quantum channel in the time-sensitive network;
determining a quantum channel synchronization time associated with the secret information exchanged via the quantum channel; and
modifying a local classical oscillator configured to provide a current time based on the quantum channel synchronization time.

10. The method of claim 9, further comprising:
determining a classical channel synchronization time associated with the time-sensitive network; and
comparing the quantum channel synchronization time with the classical channel synchronization time.

11. The method of claim 10, wherein comparing the quantum channel synchronization time with the classical channel synchronization time includes at least one of using a look-up table, using an algorithm, or subtracting the quantum channel synchronization time from the classical channel synchronization time.

12. The method of claim 10, further comprising:
modifying the local classical oscillator based on the quantum channel synchronization time and comparison of the quantum channel synchronization time with the classical channel synchronization time.

13. The method of claim 12, further comprising:
determining the quantum channel synchronization time after the local classical oscillator is modified based on the classical channel synchronization time;
modifying the local classical oscillator based on the classical channel synchronization time before modifying the local classical oscillator based on the quantum channel synchronization time.

14. The method of claim 12, further comprising:
instructing transmission of a first message to be displayed on a display of at least one computing device of the computing devices indicating the modification of the local classical oscillator based on the quantum channel synchronization time after modifying the local classical oscillator based on the classical channel synchronization time.

15. The method of claim 14, further comprising:
instructing transmission of the first message to be displayed on the display at the at least one computing device of the computing devices based on a difference between the quantum channel synchronization time and the classical channel synchronization time exceeding a threshold time period.

16. The method of claim 9, wherein the secret information further includes one or more of a quantum encryption key or a data hash.

17. The method of claim 9, further comprising:
measuring quantum bit error rates in links that form the quantum channel between the computing devices that are dedicated to exchanging the secret information.

18. A method comprising:
instructing computing devices that communicate messages with each other via a time-sensitive network to securely exchange the messages using secret information;
directing the computing devices to exchange the secret information via a dedicated quantum channel in the time-sensitive network;
determining a classical channel synchronization time associated with the time-sensitive network;
modifying a local classical oscillator based on the classical channel synchronization time;
determining a quantum channel synchronization time associated with the secret information exchanged via the dedicated quantum channel;
comparing the classical channel synchronization time and the quantum channel synchronization time; and
modifying the local classical oscillator configured to provide a current time based on the quantum channel synchronization time after modifying the local classical oscillator based on the classical channel synchronization time and quantum channel synchronization time exceeds a threshold time period.

19. The method of claim 18, further comprising:
instructing transmission of a message to be displayed on a display of at least one computing device of the computing devices indicating the modification of the local classical oscillator based on the quantum channel synchronization time after modifying the local classical oscillator based on the quantum channel synchronization time.

20. The method of claim 18, wherein the secret information includes one or more of a quantum encryption key, an indication of non-repudiation, or a data hash.

* * * * *